(12) United States Patent
Harada et al.

(10) Patent No.: US 10,386,813 B2
(45) Date of Patent: Aug. 20, 2019

(54) COMBINED SYSTEM HAVING MACHINE TOOL AND ROBOT

(71) Applicant: FANUC CORPORATION, Yamanashi (JP)

(72) Inventors: Kunihiko Harada, Yamanashi (JP); Yasuhiro Nakahama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 297 days.

(21) Appl. No.: 15/367,203

(22) Filed: Dec. 2, 2016

(65) Prior Publication Data

US 2017/0160717 A1 Jun. 8, 2017

(30) Foreign Application Priority Data

Dec. 4, 2015 (JP) ................................. 2015-237538

(51) Int. Cl.
  *G05B 19/402* (2006.01)
  *G05B 19/4061* (2006.01)
  *G05B 19/418* (2006.01)

(52) U.S. Cl.
  CPC ....... *G05B 19/402* (2013.01); *G05B 19/4061* (2013.01); *G05B 19/41825* (2013.01); *G05B 2219/36262* (2013.01); *G05B 2219/50362* (2013.01); *Y02P 90/087* (2015.11); *Y02P 90/18* (2015.11)

(58) Field of Classification Search
  CPC .................... G05B 19/402; G05B 2219/36262
  See application file for complete search history.

(56) References Cited

U.S. PATENT DOCUMENTS

| 4,651,601 A | 3/1987 | Sasaki |
| 5,075,866 A * | 12/1991 | Goto ................... G05B 19/4097 700/182 |
| 6,140,788 A | 10/2000 | Watanabe et al. |
| 2005/0224479 A1* | 10/2005 | Watanabe .............. B25J 9/1666 219/125.1 |

(Continued)

FOREIGN PATENT DOCUMENTS

| CN | 101088718 A | 12/2007 |
| CN | 101226387 A | 7/2008 |

(Continued)

*Primary Examiner* — Kenneth M Lo
*Assistant Examiner* — Mohammad A Rahman
(74) *Attorney, Agent, or Firm* — Hauptman Ham, LLP

(57) ABSTRACT

A combined system having a function for rapidly detecting and correcting a positional misalignment between a machine tool and a robot. The combined system includes: a machine tool having a table and a workpiece fixing jig integrally movable with the table; a robot system separated from the machine tool and having a robot configured to supply or take out a workpiece to or from the jig; a network for information transmission between the machine tool and the robot; an interference judging part which judges occurrence of interference, based on a disturbance value of each axis of the robot, when the workpiece is supplied to or taken out from the jig; and an interference avoiding part which, when it is judged that the interference occurs, stops a motion of the robot and moves the table in a direction of at least one axis based on the disturbance value.

4 Claims, 10 Drawing Sheets

(56) References Cited

U.S. PATENT DOCUMENTS

| | | | | |
|---|---|---|---|---|
| 2014/0028040 A1* | 1/2014 | Oda | ............ | B25J 15/083 |
| | | | | 294/115 |
| 2015/0328771 A1* | 11/2015 | Yuelai | ............ | B25J 9/1612 |
| | | | | 414/730 |
| 2017/0028558 A1* | 2/2017 | Nishi | ............ | B25J 9/1666 |

FOREIGN PATENT DOCUMENTS

| | | | |
|---|---|---|---|
| CN | 102233579 | A | 11/2011 |
| CN | 103085067 | A | 5/2013 |
| CN | 105082155 | A | 11/2015 |
| JP | 5-111886 | A | 5/1993 |
| JP | 5-116094 | A | 5/1993 |
| JP | 11042575 | A | 2/1999 |
| JP | 2001-287033 | A | 10/2001 |
| JP | 2009-208209 | A | 9/2009 |
| JP | 2010277425 | A | 12/2010 |
| JP | 2013-6244 | A | 1/2013 |

* cited by examiner

COMBINED SYSTEM HAVING MACHINE TOOL AND ROBOT

RELATED APPLICATIONS

The present application claims priority to Japanese Patent Application Number 2015-237538 filed Dec. 4, 2015, the disclosure of which is hereby incorporated by reference herein in its entirety.

BACKGROUND OF THE INVENTION

1. Field of the Invention

The preset invention relates to a combined system including a machine tool and a robot.

2. Description of the Related Art

In a production line including a machine tool such as a machining center or a lathe, a robot is often used to carry out an exchange operation of a workpiece or a tooling, etc. An installation environment of the machine tool and the robot may be different between each production line. For example, the machine tool and the robot are independently located on a floor, or, the robot may be mounted on the machine tool located on the floor.

When a pedestal of the machine tool or the robot is fixed to the floor, it is preferable that the pedestal be tightly fixed by using an anchor bolt, etc. On the other hand, when the machine tool or the robot cannot be fixed or is loosely fixed to the floor, the install position thereof relative to the floor may be displaced due to vibration generated by the motion of the machine tool or the robot. As a result, the positional relationship between the robot and the machine tool may be changed.

Normally, the robot is moved along positional coordinates which are previously taught based on the positional relationship between the machine tool and the robot, so as to carry out the exchange operation of the workpiece, etc. Therefore, when the positional relationship between the machine tool and the robot is changed, a jig of the machine tool may interfere with the workpiece during the exchange of operation of the workpiece, whereby a load of each axis of the robot may be increased and/or the posture of the workpiece when attaching it to the jig may be changed. As a result, the workpiece cannot be correctly exchanged in the machine tool.

In such a case, it is necessary to teach the robot again. In particular, in a system where one robot is operated so as to attach/detach a workpiece for a plurality of machine tools, it is necessary to teach the robot for each machine tool when the position of the robot relative to the floor is displaced.

As a relevant prior art for automatically teaching a robot in a short time, JP H05-111886 A discloses a robot system in which a six-axes for sensor is attached to a manipulator so as to carry out impedance control of the manipulator, and a calibration method in which fix-point observation is carried out by inserting a tool (rod) attached to a wrist of the manipulator into a hole of the jig.

JP 2013-006244 A discloses a position adjustment method, in which a motion for exchanging a work tool based on a previously determined command value is executed, and the command value is corrected, based on the magnitude and direction of a load generated by interference between the work tool and a robot during the exchanging motion, so as to reduce the load.

JP 2009-208209 A discloses a technique in which an amount of deviation of the position of a first work table from a predetermined position is detected by a camera, so as to correct teaching data used as criteria for the motion of a conveyor robot, based on the detection result.

Further, JP H05-116094 A discloses an abnormal load detection method, in which a disturbance torque estimated by a disturbance observer immediately before a movable part of a machine is stored, the stored disturbance torque is subtracted from an estimated disturbance torque during the movable part is moved, and the calculated value is detected as an abnormal load when the calculated value is larger than a setting value.

In the technique of JP H05-111886 A, JP 2013-006244 A or JP 2009-208209 A, a dedicated detection unit is used to obtain information regarding the positional misalignment. Therefore, when the detection unit is attached to the manipulator, the weight of the workpiece handled by the manipulator is limited due to the weight of the detection unit.

On the other hand, a disturbance value such as the estimated disturbance torque as described in JP H05-116094 A is varied depending on whether or not a robot interferes with and a workpiece, and thus it is possible to judge as to whether or not the interference occurs, based on the disturbance value of each axis. However, in general, when each axis of the robot is operated, the disturbance value of each axis is dynamically changed without depending on the occurrence of the interference, in particular, an amount of the change in the disturbance value is increased as the motion speed of the axis is increased. Therefore, in the method for judging the occurrence of the interference based on the disturbance value, it is necessary to significantly reduce the motion speed (or search speed) of the robot for avoiding the interference, in order to preventing false detection due to the change in the disturbance value. As a result, it is difficult to operate the robot so that the robot quickly moves in order to avoid the interference (or correct the positional misalignment).

SUMMARY OF THE INVENTION

Therefore, an object of the present invention is to provide a combined system having a function for rapidly detecting and correcting a positional misalignment between a machine tool and a robot.

According to the present invention, there is provided a combined system comprising: a machine tool having a numerical controller, a table movable by being controlled by the numerical controller, and a workpiece fixing jig arranged on the table and integrally movable with the table; a robot system separated from the machine tool and having a robot with a robot hand configured to grip a workpiece, and a robot controller for controlling the robot, the robot being configured to supply or take out the workpiece to or from the workpiece fixing jig; a network for information transmission at least between the numerical controller and the robot controller; an interference judging part which judges occurrence of interference between the work fixing jig and the workpiece, based on a disturbance value of each axis of the robot, when the workpiece is supplied to or taken out from the workpiece fixing jig; and an interference avoiding part which, when the interference judging part judges the interference occurs, stops a motion of the robot and moves the table in a direction of at least one axis based on the disturbance value of each axis of the robot, so as to avoid the interference.

In a preferred embodiment, the interference avoiding part searches the direction of movement of the table for avoiding the interference, based on a change in the disturbance value of each axis of the robot due to the movement of the table along at least two axes.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
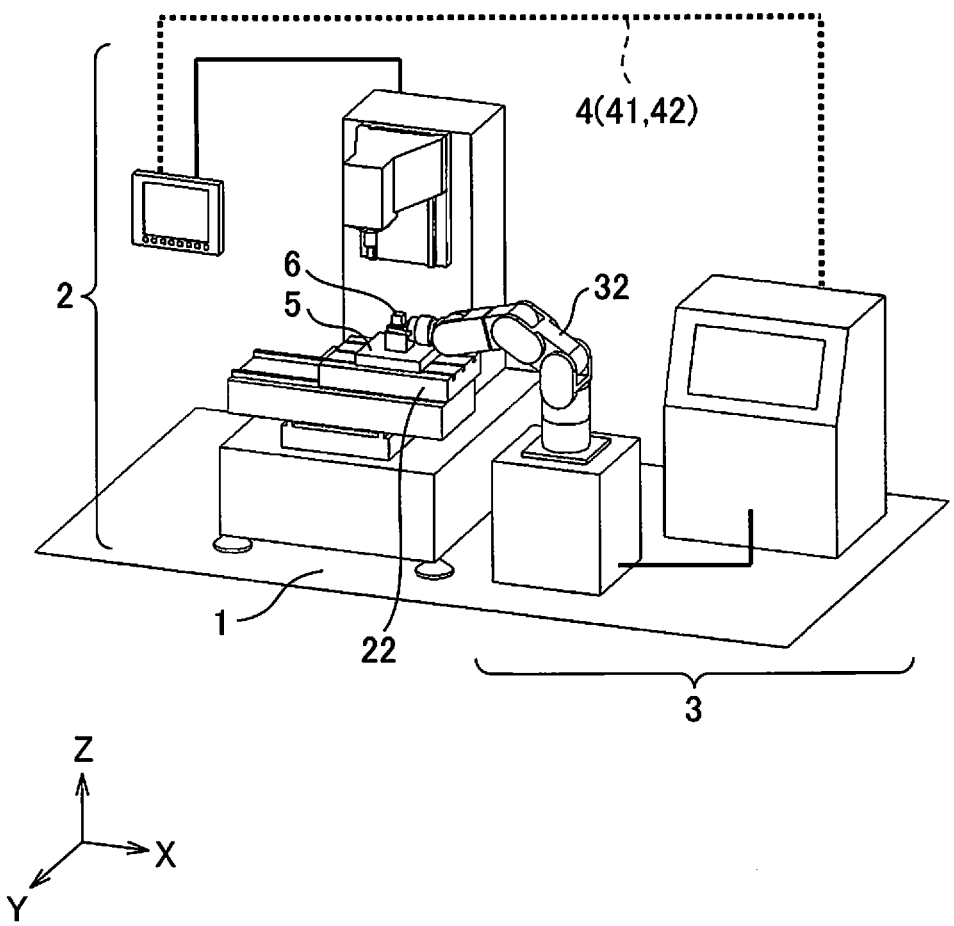
FIG. 1 is a view showing a schematic configuration of a combined system according to a preferred embodiment of the present invention.

FIG. 1 exemplifies a schematic configuration of a combined system according to a preferred embodiment of the present invention. The combined system includes a machine tool 2 and a robot system 3 which are located on a floor (or installation surface) 1, and FIGS. 2 and 3 show configurations of machine tool 2 and robot system 3, respectively.

Figure 2:
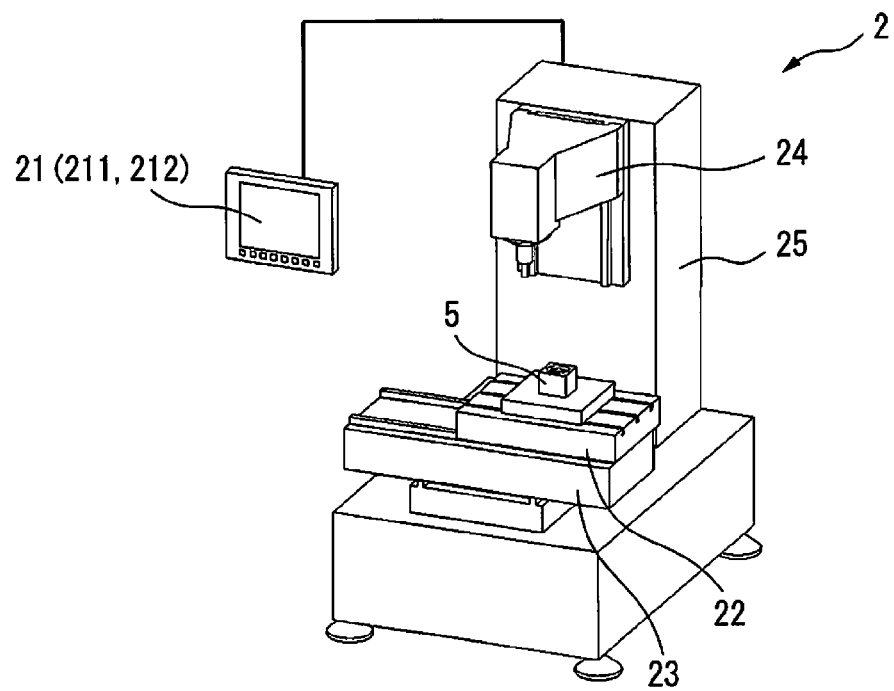
FIG. 2 is a view showing an example of a configuration of a machine tool included in the combined system of FIG. 1.

As shown in FIG. 2, machine tool 2 has a spindle head 24 movable in a Z-direction (or the vertical direction) relative to column 25, a table 22 having a workpiece fixing jig 5 positioned on an upper surface of table 22, and a numerical controller 21 for controlling the motion of machine tool 2. Table 22 is movable in X- and Y-directions (or in a plane) by being combined with a saddle 23. Table 22 is configured to be moved by a command from numerical controller 21, and workpiece fixing jig 5 positioned on the upper surface of table 22 is also moved integrally with table 22 in the X- and Y-directions. In addition, numerical controller 21 has a first memory 211 and a first CPU 212, and the functions thereof will be explained below.

Figure 3:
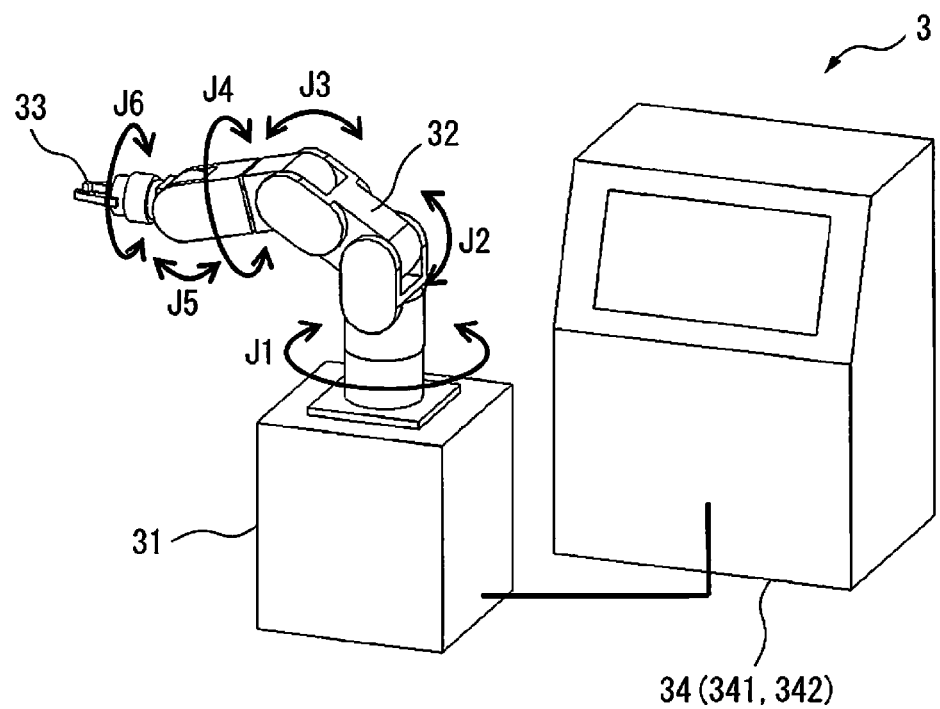
FIG. 3 is a view showing an example of a configuration of a robot included in the combined system of FIG. 1.

As shown in FIG. 3, robot system 3 has a robot pedestal 31 located on floor 1 independently from machine tool 2, a robot mechanical unit 32 positioned on robot pedestal 31, and a robot controller 34 for controlling the motion of robot mechanical unit 32. For example, robot mechanical unit 32 is a multi-joint robot having six (J1 to J6) axes, and has a robot hand 33 attached to a front end (J6 axis) of mechanical unit 32. Robot mechanical unit 32 has a sufficient number of rotation axes in order to move robot hand 33 to an arbitrary posture. In addition, robot controller 34 has a second memory 341 and a second CPU 342, and the functions thereof will be explained below.

Figure 4A:
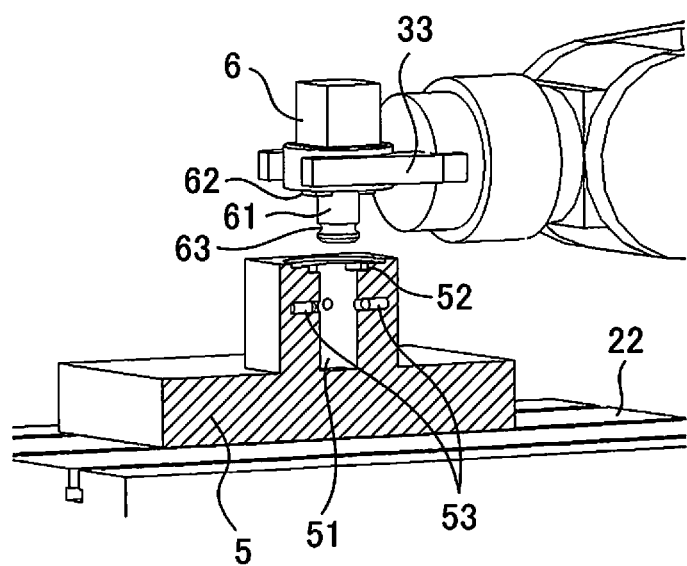
FIG. 4a is an enlarged view around a workpiece fixing jig included in the combined system of FIG. 1, in which a robot hand grips a workpiece.
Figure 4B:
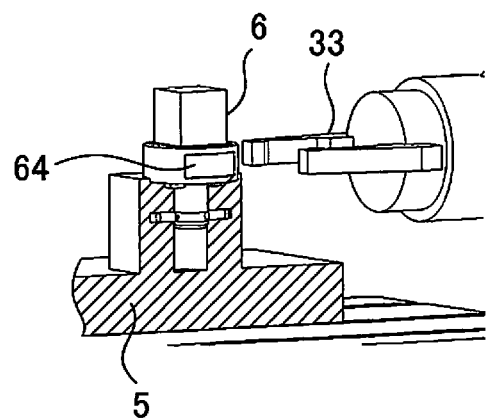
FIG. 4b is an enlarged view around the workpiece fixing jig included in the combined system of FIG. 1, in which the workpiece is held by the workpiece fixing jig.

FIG. 4a is an enlarged view showing workpiece fixing jig 5 positioned on table 22 of machine tool 2, a workpiece 6 to be handled in the combined system, and robot hand 33 gripping workpiece 6. Workpiece fixing jig 5 has a pin hole 51 parallel to the Z-direction, a keyway 52 formed at an upper end of pin hole 51, and a clamp structure 53 configured to project in radially inward direction of pin hole 51. On the other hand, workpiece 6 has a pin 61 having an outer diameter smaller than an inner diameter of pin hole 51, a key 62 configured to engage with keyway 52, a clamp seating surface 63 configured to be clamped by clamp structure 53, and a gripped portion 64 (see FIG. 4b) configured to be gripped by robot hand 33. In the illustrated embodiment, workpiece 6 is fixed to workpiece fixing jig 5 by positioning pin 61 and pin hole 51 coaxially to each other, by engaging key 62 with keyway 52, and by clamping seating surface 63 by clamp structure 53. In addition, when the workpiece is fixed, pin 61 does not interfere with pin hole 51.

As shown in FIG. 1, the combined system of the embodiment includes a network 4 having a memory part for storing information transmitted from machine tool 2 and robot system 3, and an arithmetic processing part for executing various calculation based on the information of the memory part. Network 4 is configured to transmit information at least between numerical controller 21 and robot controller 34, and numerical controller 21 and robot controller 34 may be included in network 4 as components thereof. In this embodiment, first memory 211 of (or incorporated in) numerical controller 21 and second memory 341 of (or incorporated in) robot controller 34 may function as the memory part of network 4, and first CPU 212 of (or incorporated in) numerical controller 21 and second CPU 342 of (or incorporated in) robot controller 34 may function as the arithmetic processing part of network 4.

Figure 5A:
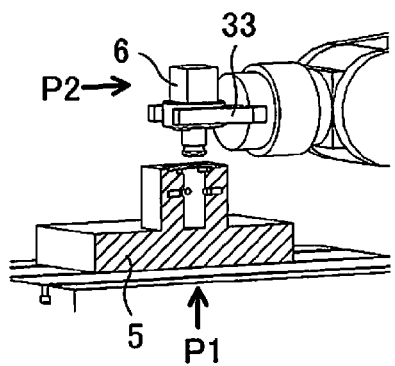
FIG. 5a is a view showing an example of a motion of supplying the workpiece by the robot, in which the robot gripping the workpiece is moved to a workpiece supply start position.
Figure 5B:
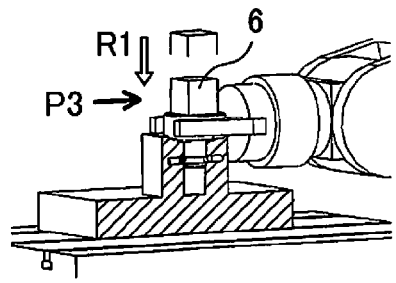
FIG. 5b is a view showing an example of the motion of supplying the workpiece by the robot, in which the robot is moved to a workpiece fix position.
Figure 5C:
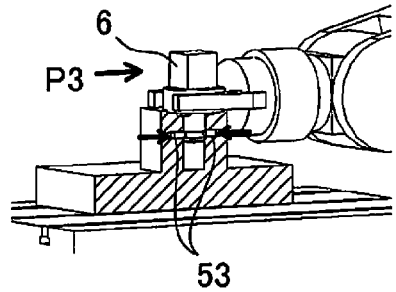
FIG. 5c is a view showing an example of the motion of supplying the workpiece by the robot, in which the workpiece is held by a clamp structure.
Figure 5D:
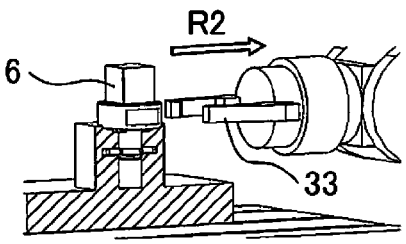
FIG. 5d is a view showing an example of the motion of supplying the workpiece by the robot, in which the robot is moved to a restart position.
Figure 6:
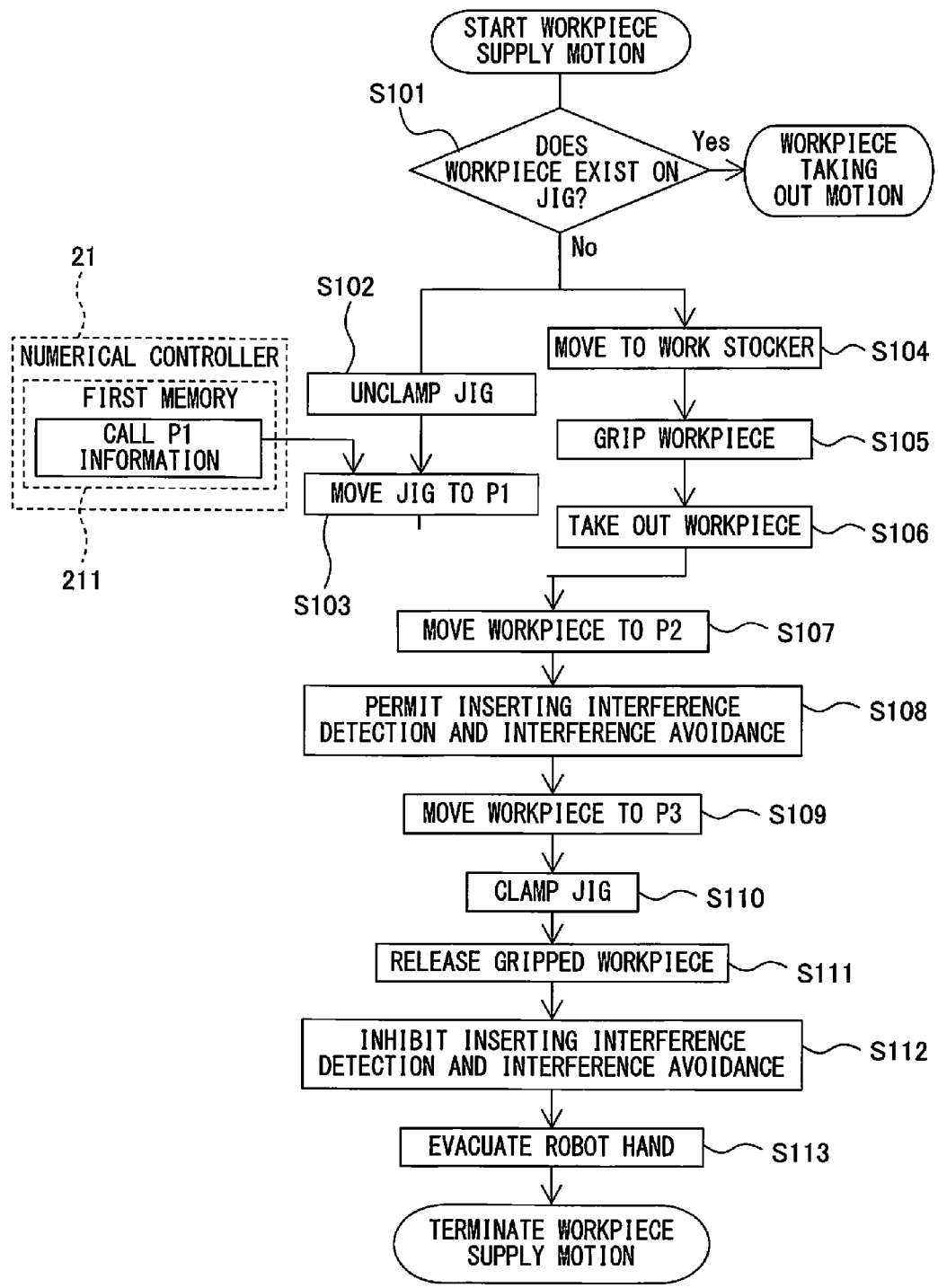
FIG. 6 is a flowchart showing a procedure of the workpiece supplying motion in the combined system of FIG. 1.

FIGS. 5a to 5d show an example of the motion for supplying workpiece 6 to workpiece fixing jig 5, and FIG. 6 is a flowchart showing the procedure of the supplying motion. Since the motion for taking out workpiece 6 from workpiece fixing jig 5 may be a reverse motion of the supplying motion, only the supplying motion will be explained below, and a detailed explanation of the taking out motion will be omitted.

First, in step S101, it is judged as to whether or not the workpiece exists on workpiece fixing jig 5, and then, if the workpiece exists on the jig, the motion for taking out workpiece is carried out. On the other hand, the workpiece does not exist on jig 5, numerical controller 21 controls workpiece fixing jig 5 so that jig 5 is in an unclamp state (or so that clamp structure 53 is in an open state). Then, as shown in FIG. 5a, numerical controller 21 moves fixing jig 5 to a predetermined workpiece exchange position P1 (steps S102 to S103). In parallel with these steps, in robot system 3, robot hand 33 is moved to a workpiece stocker, and then robot hand 33 grips and takes out a workpiece to be processed by machine tool 2 (steps S104 to S106).

Next, robot controller 34 controls the so as to convey workpiece 6 gripped by robot hand 33 to a workpiece supply start position P2 predetermined with respect to workpiece exchange position P1 (step S107). In this regard, workpiece supply start position P2 is defined as positional information relative to workpiece fixing jig 5 at workpiece exchange position P1. In the embodiment, workpiece supply start position P2 corresponds to a position where workpiece 6 is translated (or moved without changing the posture thereof) by a predetermined distance upwardly along a center axis of pin hole 51, from a workpiece fix position P3 as shown in FIG. 5b.

In the next step S108, interference between robot hand 33 and fixing jig 5 is detected, and a process for avoiding the interference is validated or permitted, as explained below.

In the next step S109, as shown in FIG. 5b, robot controller 34 controls the robot so as to translate workpiece 6, from workpiece supply position P2 to workpiece fix position P3, along a workpiece supply path R1. Next, as shown in FIG. 5c, after workpiece 6 is moved to workpiece fix position P3, numerical controller 21 drives clamp structure 53 so as to grip clamp seating surface 63 (see FIG. 4a), whereby the fixing motion of workpiece 6 is completed (step S110).

Finally, as shown in FIG. 5d, after workpiece 6 is fixed, robot controller 34 controls the robot so that robot hand 33 releases workpiece 6 (step S111), invalidates or inhibits the detection of interference and the process for avoiding the interference validated or permitted in step S108 (step S112), and moves robot hand 33 away from workpiece 6 along a predetermined evacuation path R2 (step S113), whereby the workpiece supply motion is completed.

In addition, the information of workpiece exchange position P1 called or read in step S103 may be stored in first memory 211 in a form of positional information or a motion program, etc. Also, the information of workpiece supply start position P2, workpiece fix position P3, workpiece supply path R1 and evacuation path R2 may be stored in second memory 341 in a form of positional information or a motion program, etc.

Figure 7:
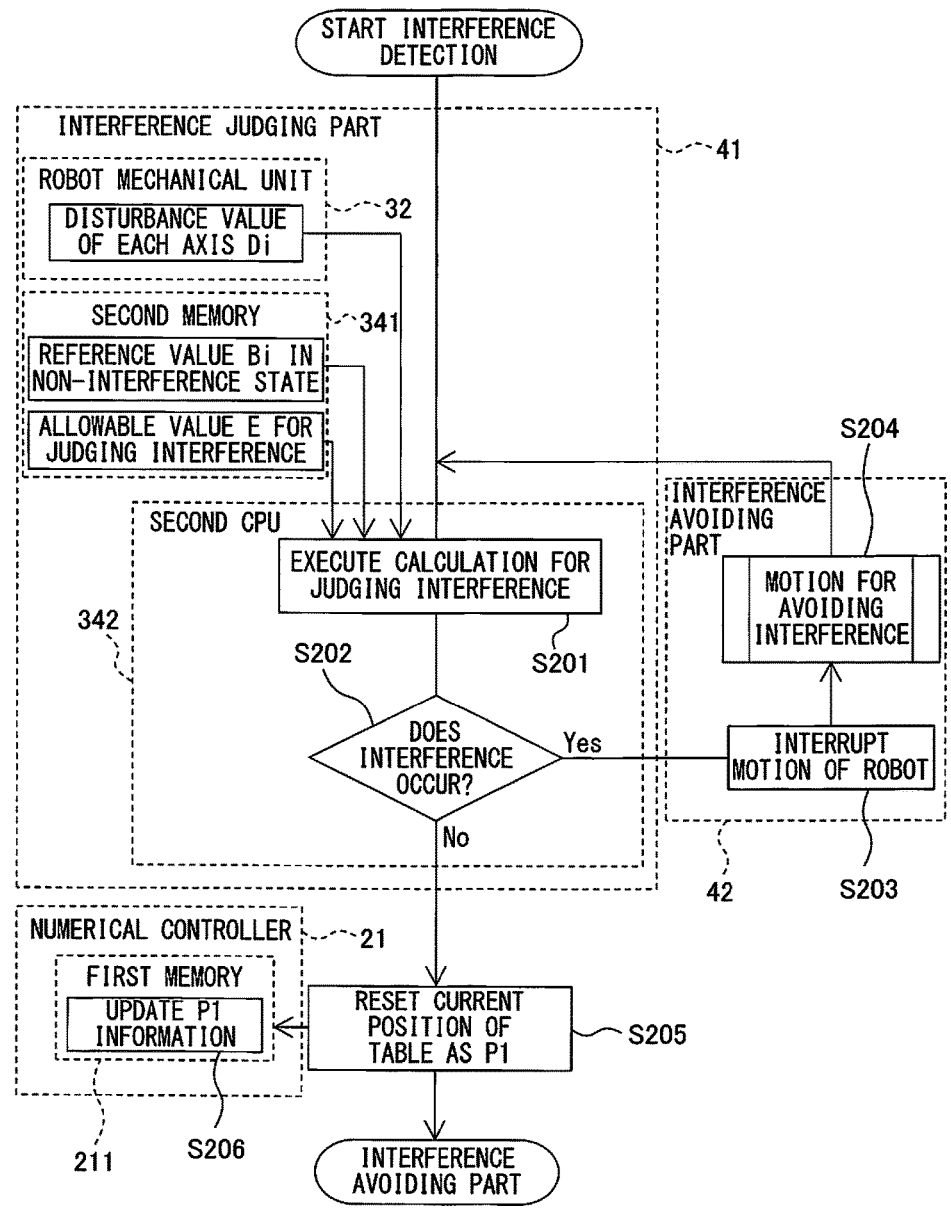
FIG. 7 is a flowchart showing a detail of an interruption process for detecting interference in the flowchart of FIG. 6.
Figure 8:
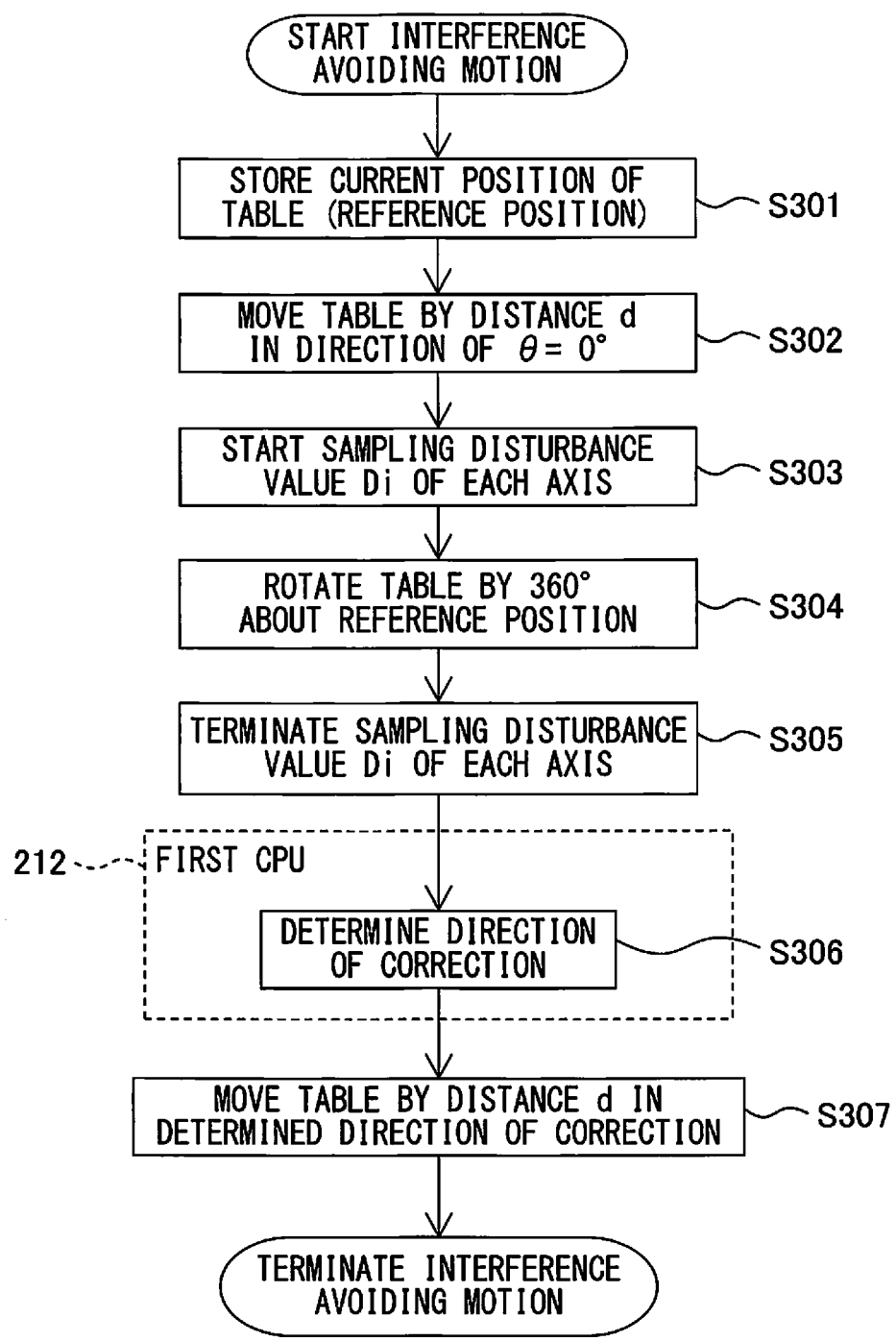
FIG. 8 is a flowchart showing a detail of a motion for avoiding interference in the flowchart of FIG. 7.

Next, examples of processes for judging and avoiding interference between workpiece 6 and workpiece fixing jig 5 during the supply motion of workpiece 6 will be explained, with reference to flowcharts of FIGS. 7 and 8.

The processes for judging and avoiding the interference may be carried out by an interference judging part 41 and an interference avoiding part 42 arranged in network 4, respectively. In this embodiment, as shown in FIG. 7, interference judging part 41 may be constituted from robot mechanical unit 32, second memory 341 and second CPU 342, and interference avoiding part 42 may be constituted from first memory 211, first CPU 212, robot mechanical unit 32, second memory 341 and second CPU 342.

Interference judging part 41 starts to monitor a disturbance value Di (i=axis number) of each axis of robot mechanical unit 32, when workpiece 6 is moved to supply start position P2 during the workpiece supply motion. Interference judging part 41 compares disturbance value Di to a reference disturbance value Bi at appropriate time intervals, reference value Bi being predetermined based on data obtained when workpiece 6 and fixing jig 5 are operated without interference therebetween. Then, when a difference between disturbance value Di and reference value Bi exceeds a predetermined allowable value E, interference judging part 41 judges that the interference has occurred (step S201). In this regard, the disturbance value (or disturbance torque) of each axis may be estimated by a conventional disturbance observer, or measured by a torque sensor, etc., provided to each axis.

In the method of comparing disturbance value Di of each axis to reference value Bi, the occurrence of interference should be comprehensively judged by using the change in disturbance value Di of each axis. However, if it is experimentally known that only a disturbance value of a specific axis is significantly changed when the interference occurs, the occurrence of interference can be judged by monitoring only the disturbance value of the specific axis.

Figure 9A:
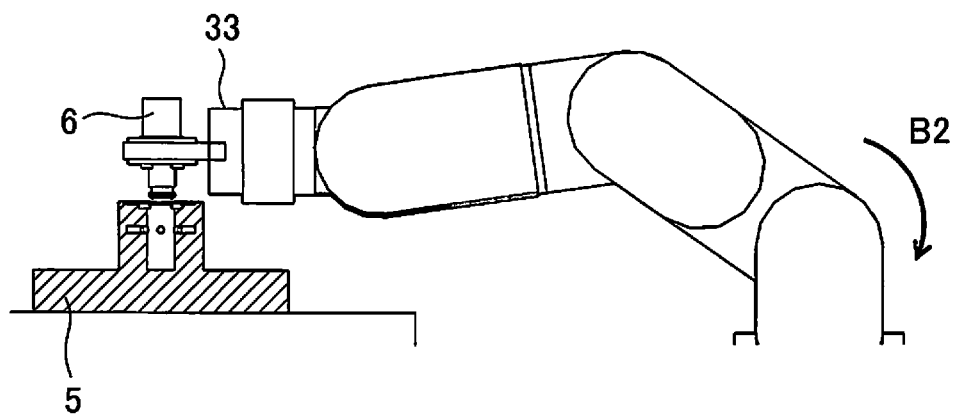
FIG. 9a shows the robot and the workpiece which do not interfere with each other.
Figure 9B:
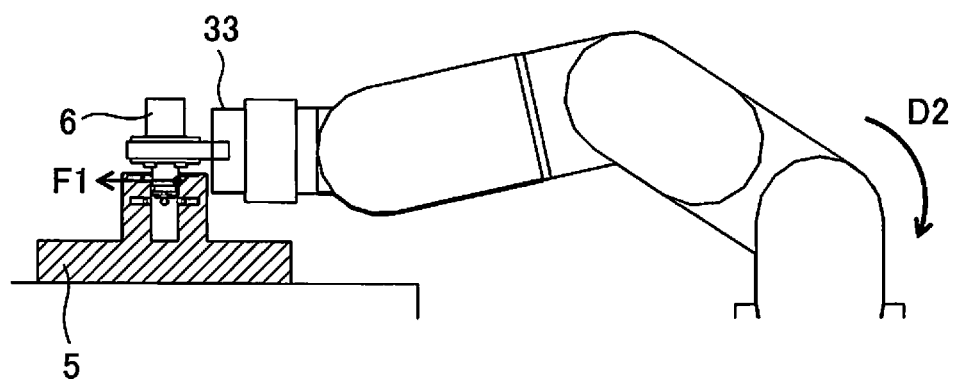
FIG. 9b shows the robot and the workpiece which interfere with each other.

In the present embodiment, it is assumed that machine tool 2 is moved by a small distance relative to floor 1 for any reason. In this regard, FIG. 9a shows a positional relationship between workpiece fixing jig 5 and workpiece 6 (or robot hand 33) in the workpiece supply motion, in which workpiece fixing jig 5 is moved to workpiece exchange position P1 and workpiece 6 is moved to workpiece supply start position P2 (see FIG. 5a). On the other hand, FIG. 9b shows a state in which pin 61 interferes with pin hole 51, during workpiece 6 is moved to workpiece fix position P3. In the example of FIG. 9b, the position of workpiece 6 is elastically displaced by a reactive force F1 from workpiece fixing jig 5. In other words, the displacement of workpiece 6 will be cancelled if reactive force F1 is removed.

In the state of FIG. 9b, at each axis of robot mechanical unit 32, the disturbance may occur due to reactive force F1 from workpiece fixing jig 5. In an ideal model as shown in FIG. 9b, it is assumed that disturbance value D2 of the second (J2) axis of robot mechanical unit 32 is linearly changed relative to the magnitude of reactive force F1. During the supply motion of workpiece 6, when disturbance value D2 of the second axis is varied relative to reference value B2 by a predetermined allowable value E2 or more (i.e., following equation (1) is true), interference judging part 41 judges that the interference occurs, and suspends the motion (in this case, the supply motion of workpiece 6) by the robot (steps S202 and S203 in FIG. 7).

$$|D2-B2|>E \tag{1}$$

When interference judging part 41 detects the occurrence of interference, interference avoiding part 42 transmits a command for suspending the motion of the robot to robot controller 34. Then, after the motion of the robot is stopped, interference avoiding part 42 executes the interference avoiding motion, i.e., corrects the position of table 22 by moving table 22 in at the direction of at least one axis (step S204). After the positional correction is executed by interference avoiding part 42, interference judging part 41 judges that the occurrence of interference again, by using equation (1), until equation (1) is not true.

Figure 10A:
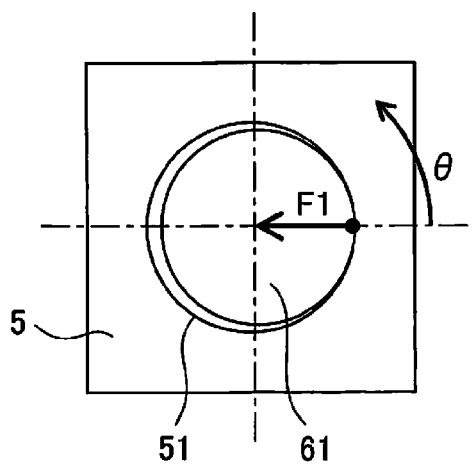
FIG. 10a is a view showing an example for correcting the position during interference avoidance, in which the position of a table when interference occurs is explained.

An example of the positional correction by interference avoiding part 42 will be explained, with reference to FIGS. 8 and 10a to 10e. First, as shown in FIG. 10a, the position of table 22 (or workpiece fixing jig 5) at the time when the interference occurs (for example, an intersection point of a cross line in FIG. 10a) is stored as a reference position (step S301), and then, table 22 (or workpiece fixing jig 5) is moved by a small distance d in an arbitrary direction (step S302). For example, as shown in FIG. 10b, table 22 is moved by distance d in a search direction θ corresponding to 0° (degree).

Next, from the current position (i.e., the state of FIG. 10b), table 22 is moved so as to trace a whole circumference (i.e., over 360°) of a circle, the center of which corresponds to the above reference position. During the circular movement, disturbance value Di of each axis is stored as data comparable to a phase θ of the table position, in second memory 341 at appropriate angular intervals (steps S303 to S305). FIGS. 10b to 10e show states in which phase θ corresponds to 0°, 90°, 180° and 270°, respectively. In each of FIGS. 10a to 10e, the direction and the length of arrow F1 respectively represent the direction and the magnitude of reactive force F1 at each phase. After table 22 is moved by one revolution on the circumference of the circle, table 22 is moved or returned to the reference position.

Figure 10B:
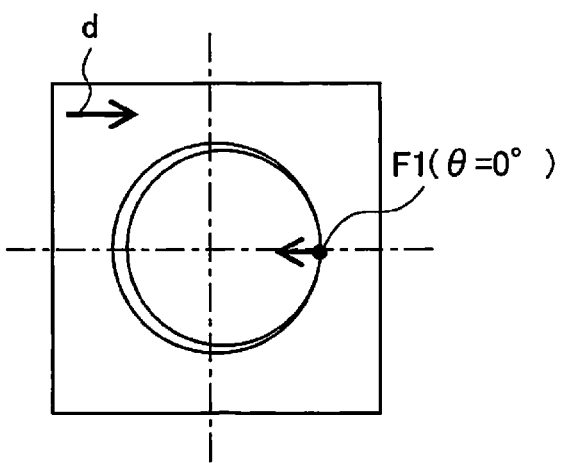
FIG. 10b is a view showing an example for correcting the position during interference avoidance, in which the table is moved to the phase angle position of 0 degree on a circumference.
Figure 10C:
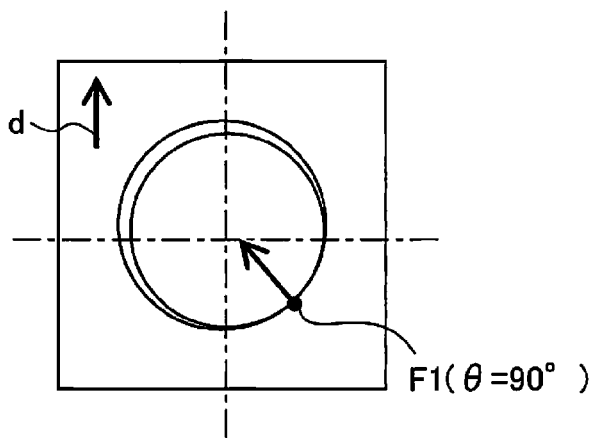
FIG. 10c is a view showing an example for correcting the position during interference avoidance, in which the table is moved to the phase angle position of 90 degrees on the circumference.
Figure 10D:
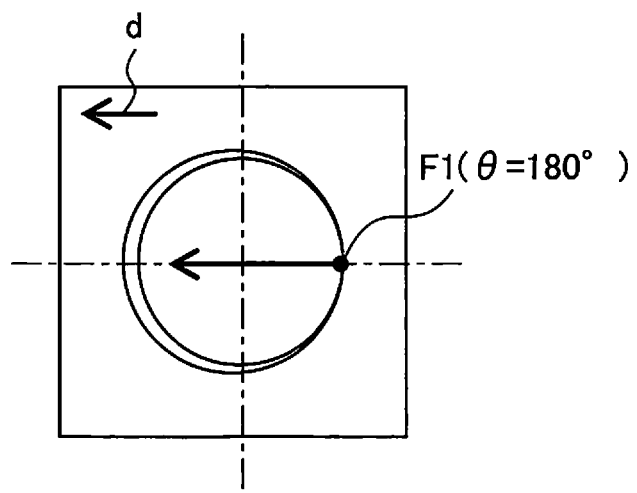
FIG. 10d is a view showing an example for correcting the position during interference avoidance, in which the table is moved to the phase angle position of 180 degrees on the circumference.
Figure 10E:
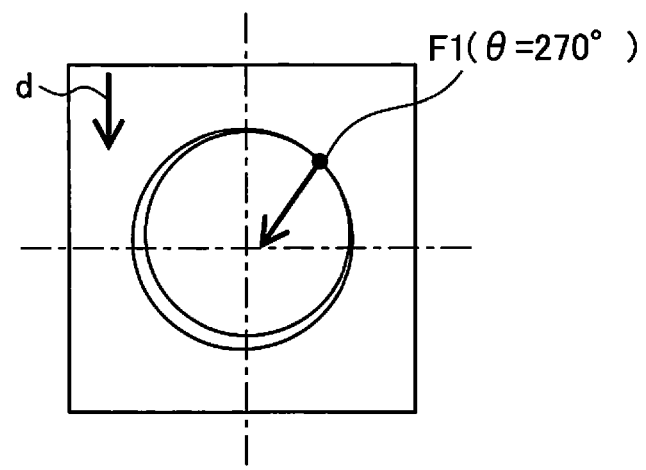
FIG. 10e is a view showing an example for correcting the position during interference avoidance, in which the table is moved to the phase angle position of 270 degrees on the circumference.

Based on the data of the disturbance value of each axis stored in second memory 341, first CPU 212 determines a direction of correction as a phase ψ (in this case, ψ=θ=0° as shown in FIG. 10b), in which the value of the left side of equation (1) is minimized (step S306), and then, table 22 is moved by small distance d in the direction of phase ψ (step S307).

With reference to FIG. 7 again, after the positional correction process including searching of the movement direction as described above is executed several times, when the difference (or the comparison result) between disturbance value Di and reference value Bi converges not more than allowable value E, interference judging part 41 judges that the interference avoidance motion has been completed. Then, the position of table 22 at the time when the interference avoidance motion has been completed (or the current position) is reset as new workpiece exchange position P1 (step S205), and then the information in first memory 211 is updated (step S206). At the time when the interference avoidance motion has been completed, robot controller 34 restarts the supply motion of workpiece 6, and completes the supply motion.

In addition, an upper limit of the number or frequency of repeating the positional correction process may be previously determined. In this case, when the difference between the disturbance value and the reference value does not converge lower than the allowable value within the predetermined upper limit, it can be judged that the interference cannot be avoided.

In the above embodiment, the robot is not basically moved in the positional correction process for avoiding interference, instead, the table having the workpiece fixing jig is moved. Therefore, the disturbance value of each axis of the robot is not dynamically varied, whereby the probability of false detection can be significantly reduced. Further, in the embodiment, the movement direction of the table for avoiding interference is searched based on the change in the disturbance value of each axis due to the (rotational) movement of the table by using at least two axes (the X- and Y-axes), and the interference can be avoided by moving the table in the direction of at least one axis. In this regard, the movement direction can be calculated based on the value and the direction of disturbance applied to each axis, and in such a case, the above searching is not necessary.

According to the present invention, the interference due to the small positional deviation between the machine tool and the robot can be detected by the change in the disturbance value of each axis of the robot, and thus a dedicated detector required in the prior art is not necessary in the present invention. Further, in the present invention, since the motion for avoiding interference is carried out by the table of the machine tool after the interference is detected, an effect on the disturbance value by the motion of the robot can be reduced, whereby a detection error due to the disturbance can be reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A combined system, comprising:
    a machine tool having
        a numerical controller,
        a table movable under control of the numerical controller, and
        a workpiece fixing jig arranged on the table and integrally movable with the table;
    a robot system separated from the machine tool and having
        a robot with a robot hand configured to grip a workpiece, and
        a robot controller for controlling the robot, the robot being configured to supply or take out the workpiece to or from the workpiece fixing jig;
    a network for information transmission at least between the numerical controller and the robot controller;
    an interference judging part which, when the workpiece is supplied to or taken out from the workpiece fixing jig, judges occurrence of interference between the workpiece fixing jig and the workpiece due to a positional misalignment between the workpiece fixing jig and the workpiece, based on a disturbance value of each axis of the robot; and
    an interference avoiding part which, when the interference judging part judges the interference occurs, stops a motion of the robot and moves the table in a direction of at least one axis based on the disturbance value of each axis of the robot, so as to avoid the interference.

2. The combined system as set forth in claim 1, wherein the interference avoiding part searches for the direction of movement of the table for avoiding the interference, based on a change in the disturbance value of each axis of the robot due to the movement of the table along at least two axes.

3. A combined system as set forth in claim 1, wherein the disturbance value is due to a reactive force from the workpiece fixing jig.

4. A combined system as set forth in claim 1, wherein the interference judging part judges the interference occurs when $|Di-Bi|>E$ is satisfied, where
    Di is the disturbance value in an i-th axis,
    Bi is a reference value at the i-th axis, and
    an E is a predetermined allowable value.

* * * * *